3,763,252
5-ALKAPOLYENYL-2-NORBORNENES
Seimei Yasui, Takatsuki, Masaaki Hirooka, Ibaragi, and Teruo Oshima, Nishinomiya, Japan, assignors to Sumitomo Chemical Company, Ltd., Osaka, Japan
No Drawing. Continuation of abandoned application Ser. No. 799,995, Feb. 17, 1969. This application Aug. 16, 1971, Ser. No. 172,278
Claims priority, application Japan, Feb. 20, 1968, 43/10,961, 43/10,962; Mar. 5, 1968, 43/14,446
Int. Cl. C07c 5/24
U.S. Cl. 260—666 PY    10 Claims

ABSTRACT OF THE DISCLOSURE

Novel 5 - alkapolyenyl - 2 - norbornenes having, at 5-position thereof or through a hydrocarbon group substituted at 5-position of the norbornene nucleus, a non-conjugated straight chain hydrocarbon group derived from a compound obtained by polymerizing aliphatic conjugated diene. The 5-alkapolyenyl-2-norbornenes are obtained by contacting a 5-halogeno-2-norbornene or a 5-halogenated hydrocarbon-substituted-2-norbornene with aliphatic conjugated diene compound having 4 to 20 carbon atoms and an alkali metal or an organic alkali metal compound, or a compound obtained by polymerizing aliphatic conjugated diene compound having 4 to 20 carbon atoms, the compound having an alkali metal at the terminal position. These compounds are useful as, for example, third components of ethylene-propylene terpolymers.

---

This application is a continuation of the parent application Ser. No. 799,995, filed Feb. 17, 1969, now abandoned.

The present invention relates to novel 5-alkapolyenyl-2-norbornenes useful for various purposes. More particularly the present invention pertains to novel 5-alkapolyenyl-2-norbornenes, the 5-alkapolyenyl group being a non-conjugated straight chain hydrocarbon group derived from a compound obtained by polymerizing aliphatic conjugated diene.

Many norbornene compounds are already known and particularly many norbornenic diene compounds have been recently developed as the third component of ethylene-propylene rubbers. However, 5-alkapolyenyl - 2 - norbornene compounds have not been known.

The present inventors have found that novel 5-alkapolyenyl-2-norbornenes are produced by contacting an aliphatic conjugated diene having 4 to 20 carbon atoms, an alkali metal or an organic alkali metal compound, and a 5-halogeno-2-norbornene or a 5-halogenated hydrocarbon-substituted-2-norbornene or by contacting a compound obtained by polymerizing aliphatic conjugated diene having 4 to 20 carbon atoms with a 5-halogeno-2-norbornene or a 5-halogenated hydrocarbon-substituted-2-norbornene.

The present inventors have further found that the thus produced 5-alkapolyenyl-2-norbornene can be used for various purposes without further treatments as similar as conjugated diene oligomers. In other words, it can be used, for example, as paints, coating materials, various vehicles, emulsion paints, molding resins, rubber modifiers, elastomers, sealants, caulking agents, adhesives, plastic modifiers, paper or textile finishing agents, etc. The present inventors have found particularly that the 5-alkapolyenyl-2-norbornenes have excellent copolymerizability with ethylene and propylene and the resultant terpolymers have good cocurability with diene rubbers and excellent tackiness and even highly unsaturated ones are difficult to gel.

The present inventors filed two U.S. patent applications for patent concerning copolymers containing such 5-alkapolyenyl-2-norbornenes. These are U.S. patent applications Ser. No. 798,121, now U.S. Pat. 3,678,018, issued July 18, 1972, and Ser. No. 798,448, now U.S. Pat. 3,649,-573, issued Mar. 14, 1972.

Accordingly, one object of the present invention is to provide novel 5-alkapolyenyl-2-norbornenes.

Another object of the present invention is to provide a process for producing novel 5-alkapolyenyl-2-norbornenes.

Other objects of the present invention will be apparent from the following description.

In order to accomplish these objects, the present invention provides novel 5-alkapolyenyl-2-norbornenes having at 5-position thereof or through a hydrocarbon group substituted at 5-position of the norbornene nucleus a non-conjugated straight chain hydrocarbon group derived from a compound obtained by polymerizing aliphatic conjugated diene.

Further the present invention provides a process for producing 5-alkapolyenyl-2-norbornenes, which comprises contacting a 5-halogeno-2-norbornene or a 5-halogenated hydrocarbon-substituted-2-norbornene with aliphatic conjugated diene compound having 4 to 20 carbon atoms and an alkali metal or an organic alkali metal compound, or a compound obtained by polymerizing aliphatic conjugated diene compound having 4 to 20 carbon atoms, the compound having an alkali metal at the terminal position.

Still further, the present invention provides a reaction product obtained by contacting a 5-halogeno-2-norbornene or a 5-halogenated hydrocarbon-substituted-2-norbornene with aliphatic conjugated diene compound having 4 to 20 carbon atoms and an alkali metal or an organic alkali metal compound, or a compound obtained by polymerizing aliphatic conjugated diene compound having 4 to 20 carbon atoms, the compound having an alkali metal at the terminal position.

5-alkapolyenyl-2-norbornenes of the present invention are preferably represented by a general formula:

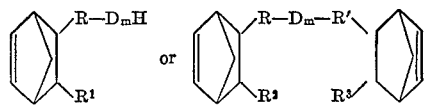

wherein $D_m$ represents a polymer of an aliphatic conjugated diene ($m$ is the degree of polymerization), R and R' are respectively hydrocarbon groups or D; $R^1$, $R^2$ and $R^3$ respectively represent hydrocarbon groups or hydrogen; and $m$ represents an integer of 2 or more. Preferably, $m$ is 2 to 200 and particularly 3 to 20. The double bond of these polyene chain is any one form of vinyl, vinylidene, vinylene, etc. Thus, the chain may be a polymerized conjugated diene in any one form of 1,4-addition. 1,2-addition and 3,4-addition or mixed addition polymers thereof. For example, oligomers obtained by the synthesis with metallic sodium consist mainly of a 1,2- or 3,4-addition product, while oligomers obtained with a compound of Groups IV to VIII (Mendeleeff Periodic Table) transition metal and an organic aluminum compound consist mainly of a 1,4-addition product. Further, the polyene chain may be an alkapolyenyl group derived from a cooligomer of a conjugated diene and another olefin such as styrene.

The alkapolyenyl group of the present invention has usually 2 to 200 double bonds and particularly 3 to 20 double bonds, and the molecular weight of the side chain is preferably 100 to 20,000 and particularly 200 to 10,000. For example, even the compounds of the present invention having molecular weight from 200 to 1,000 may be effectively used as the third component of ethylene-propylene copolymer elastomers.

The aliphatic conjugated diene components for constituting the alkapolyenyl group of the present invention have generally at least a pair of conjugated double bonds and the structure of other part thereof may be freely selected. They have preferably 4 to 20 carbon atoms and at least one double bond at their end. The concrete examples of these compounds include 1,3-butadiene, isoprene, 2-ethyl-1,3-butadiene, 2,3-dimethyl-1,3-butadiene, piperylene, 1,3-hexadiene, 2,4-hexadiene, 1,3-cyclohexadiene, 4 - phenyl - 1,3 - butadiene, 2-phenyl-1,3-butadiene, 1,4 - diphenyl - 1,3 - butadiene, myrcene, etc. Also, these components may be copolymerized with different unsaturated compounds to produce cooligomers. Such comonomers include terminally unsaturated vinyl and vinylidene compounds, and particularly conjugated compounds such as aromatic vinyl compounds. For example, styrene, vinylnaphthalene, α-methylstyrene, p-methylstyrene, p-allylstyrene, 1 - vinyl - 1 - cyclobutene, 1 - vinyl - 1 - cyclohexene, 1 - vinyl - 4,7,8,9 - tetrahydroindene, etc. may be mentioned.

5-alkapolyenyl-2-norbornenes of the present invention are produced by reacting an alkali-metal compound of a conjugated diene oligomer with a 5-halo- or 5-halogenated hydrocarbyl-2-norbornene. If a conjugated diene compound is polymerized with an alkali metal or an organic alkali metal compound, a polymer having an alkali metal at its end is obtained. If the polymer is reacted with a halogen-containing norbornene compound, a Wurtz reaction occurs and a diene oligomer is introduced into the norbornene compound. Alternatively, a halogen may be introduced into the conjugated diene oligomer at its end and the oligomer is then reacted with a 2-norbornene having an alkali metal or an alkali metal-containing group at 5-position.

5-alkapolyenyl-2-norbornenes of the present invention can be produced preferably by reacting a conjugated diene, an alkali metal or an organic alkali metal compound and a halogen-containing norbornene compound, without the necessity of separately carrying out the formation of an oligomer and the Wurtz reaction.

Even under such a condition as a Wurtz reaction of a halogenated hydrocarbon compound with an alkali metal may substantially not proceed, the reaction of the present invention can rapidly proceed in the presence of a conjugated olefinic hydrocarbon compound and a polymer of a conjugated olefinic hydrocarbon compound having at its end a hydrocarbon group derived from said halogenated hydrocarbon can be produced at a high yield. The fact that the reaction of such three components rapidly proceeds has not been expected at all because the polymerization of a conjugated olefin with an alkali metal proceeds only at a low rate under this condition. It is also interesting that, if a halogenated hydrocarbon compound is contacted with an alkali metal in the presence of a conjugated olefinic hydrocarbon compound, not only the reaction occurs far more easily than in the above-mentioned Wurtz reaction alone, but also a high yield of an oligomer having a hydrocarbon group at its end is obtained without the necessity of isolating an insoluble organic alkali compound and without the substantial formation of a hydrocarbon dimer by the dimerization of the halogenated hydrocarbon group or a hydrocarbon compound by the disproportionation of the halogenated hydrocarbon group.

In the present invention, any 5-halo- or 5-halogenated hydrocarbyl-2-norbornene compound may be used. The halogen is preferably chlorine or bromine, and the halogenated hydrocarbon group has preferably 1 to 20 carbon atoms. The hydrocarbon group may be of any structure such as aliphatic, alicyclic, aromatic, etc. Further, the norbornene ring may have substituents at other positions. Particularly, 6-substituted compounds can be effectively used. The concrete examples of these compounds include 5 - chloro - 2 - norbornene, 5 - bromo - 2 - norbornene, 5,6 - dichloro - 2 - norbornene, 5 - chloro - 6 - methyl-2 - norbornene, 5 - chloromethyl - 2 - norbornene, 5-bromomethyl - 2 - norbornene, 7 - methyl - 5 - chloromethyl - 2 - norbornene, 5 - (2' - chloroethyl) - 2 - norbornene, 5 - (4' - chloro-cyclohexenyl) - 2 - norbornene, 5-(4'-chlorophenyl)-2-norbornene, etc.

The alkali metal used in the present invention as another component may be any metal of Group Ia of the Mendeleeff Periodic Table such as lithium, sodium, potassium, rubidium, cesium, etc., but sodium and potassium are preferable. Sodium is particularly useful because it is commercially available at a low price. These alkali metals may be preferably used in the form of a large surface area such as sodium dispersion although they can also be used in any other forms. They may be also used in a melted form or as an amalgam.

The order of addition of the reactants in the present invention is not critical, but, but, for example, useful reaction products can be effectively produced by contacting an alkali metal or an organic alkali metal compound with a halogen-containing norbornene compound in the presence of a conjugated diene compound. In these reactions by-products, having a terminal structure, such as a cyclopentene ring, other than a norbornene ring, are produced. These by-products need not be separated for many uses and can be used as they are. In general, a mixture of a diene oligomer having a norbornene ring at only one end and one having norbornene rings at both ends is obtained and the mixture is separated and purified, if necessary.

Further, in the present invention, an oligomer can be smoothly produced by carrying out this kind of a reaction in the presence of a small amount of an alcohol. The term, "a small amount," used herein means an amount smaller than the mols of said alkali metal or said organic alkali metal compound.

It has been heretofore known that alcohols are effective in promoting a Wurtz reaction, but it has not been foreseeable whether or not the formation of an oligomer smoothly proceeds in the presence of a conjugated olefinic hydrocarbon compound. The formation of previously known alfincatalysts are similar to the process of the present invention in that they are the reaction products of an alkali metal with a halogenated hydrocarbon in the presence of an alcohol and an olefin. However, a high polymer of a conjugated olefinic hydrocarbon compound is produced in the case of an alfincatalyst. The catalyst is rather less suitable for the production of an oligomer as contemplated by the present invention. The addition of an alcohol in the present invention is effective in promoting the reaction, but it is more important that the addition of an alcohol permits the use of an insufficiently dehydrated solvent. The dehydration of a solvent is very important in the reactions using an alkali metal. Employment of an insufficiently dehydrated solvent makes it impossible to initiate the reaction or usually lowers the yield. Therefore, it has been heretofore considered impossible to use commercial solvents as such. The process of the present invention is very advantageous from a commercial point of view because it permits such use of commercial solvents.

The alcohols which may be used in the present invention include primary, secondary and tertiary alcohols having a hydrocarbon group of 1 to 20 carbon atoms and at least one hydroxyl group, such as, for example, methanol, ethanol, propanol, n-butanol, n-octanol, sec.-butanol, pentanol - 3, methylisopropylcarbinol, cyclohexanol, p-methylcyclohexanol, tert.-butanol, tert.-pentanol, pinacol, etc.

In the practice of the process of the present invention, the selection of a solvent is important. Preferable solvents are normally liquid compounds having an ether bond which are not reactive with an alkali metal. These solvents include acyclic ethers represented by the formula, $R_1OR_2$ or $R_1OROR_2$ and cyclic ethers having a

type structure, for example, compounds represented by the formula:

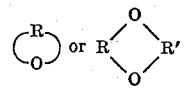

Wherein $R_1$ and $R_2$ represent hydrocarbon groups having 1 to 20 carbon atoms and R and R' represent bivalent hydrocarbon groups having 1 to 20 carbon atoms. The concrete examples of these compounds include dimethyl ether, diethyl ether, diisopropyl ether, isobutyl vinyl ether, anisole, phenetole, tetrahydrofuran, dihydrofuran, coumaran, dioxane, diethylene glycol dimethyl ether, cineole, acetal, 1,1-dimethoxyethane, etc. Cyclic ethers are suitable and particularly tetrahydrofuran is preferred.

In the practice of the present invention, the reaction temperature may be freely selected within a wide range from a temperature as low as −50° C. to an elevated temperature as high as 150° C., but the reaction generally easily proceeds at room temperature. The reaction is exothermic and proceeds considerably rapidly. Therefore, an apparatus to effect sufficient cooling is often required.

In general, the reaction is advantageously carried out at normal pressure, but the reaction may be carried out under pressure when a lower conjugated olefin or a gaseous halogenated hydrocarbon is used. Also, the reaction may be carried out by a method which comprises introducing gaseous components continuously or successively at normal pressure according to the amount of the reacted product.

The molecular weight of the resultant polymer can be controlled by suitably selecting the reaction conditions. Although the reaction temperature also affects on the molecular weight, the ratio of the alkali metal, the halogenated hydrocarbon and the conjugated olefinic hydrocarbon compound is effectively controlled. As one embodiment of the present invention, a halogenated hydrocarbon and a conjugated olefinic hydrocarbon compound at a definite ratio may be added continuously to a finely dispersed alkali metal. Then the molecular weight can be controlled by said ratio and the heat of reaction can be controlled by the rate of addition. It is preferable that the reaction system is free of the components reactive with the alkali metal such as water.

As described above, the thus produced 5-alkapolyenyl-2-norbornenes or the reaction products are very useful for various purposes. For example, they are useful as a third component of ethylene-propylene terpolymer, and the resultant terpolymers have various excellent properties. See our U.S. Pat. application Ser. No. 798,121, now U.S. Pat. 3,678,018, issued July 18, 1972, and Ser No. 798,448, now U.S. Pat. 3,649,573, issued Mar. 14, 1972.

The following examples further illustrate the process of the present invention, but should not be construed as limiting the scope of the present invention.

EXAMPLE 1

The inside of a 200 ml. four necked flask was flushed by nitrogen. Fine powder of 2.3 g. of metallic sodium and 20 ml. of dioxane were introduced into the flask. A mixture of 14.3 grams of 5-chloromethyl-2-norbornene, 13.6 grams of isoprene and 0.3 gram of methanol was dropped through a dropping funnel into the flask. After 15 minutes, methanol was added to terminate the reaction and sodium was decomposed. To the reaction mixture 200 ml. of petroleum ether was added the whole was thoroughly mixed. The mixture was transferred to a separating funnel and 200 ml. of water was added. After thoroughly mixing, the petroleum ether layer was separated and dried on silica gel for 24 hours. The solvent and unreacted materials were then distilled off under reduced pressure. Thus, 8 grams of a viscous isoprene low polymer having norbornene nucleus was obtained.

EXAMPLE 2

A 200 ml. glass autoclave was flushed with nitrogen. Four grams of sodium fine powder was fed into the autoclave. Thirty grams of isoprene and 12 ml. of 5-chloro-2-norbornene were added and a solution of 0.4 gram of tert.-butanol in 50 ml. of tetrahydrofuran was then added. On the addition, a large amount of heat was generated and the pressure suddenly increased to 7 kg./cm.$^2$ G. After 3 minutes the pressure dropped to 2 kg./cm.$^2$ G. After 5 minutes, the polymerization was terminated and the after-treatment was carried out in the same manner as in Example 1. Thus, 20 grams of a low isoprene polymer having a molecular weight of 831 was obtained. It was confirmed by NMR spectrum that the polymer has a norbornene ring at its end.

EXAMPLE 3

A one liter four necked flask equipped with a stirrer, a Dimroth condenser and a dropping funnel was flushed with nitrogen, and 32 grams of sodium dispersion in 300 ml. of tetrahydrofuran was prepared in the flask.

A mixture of 200 grams of isoprene, 130 grams of 5-bromo-methyl-2-norbornene and 4 ml. of methanol was dropped into the flask through the dropping funnel in 50 minutes while the reaction temperature was maintained at about 15° C. After-treatment was carried out in the same manner as in Example 1. Thus, 138 grams of a viscous liquid was obtained. The product was found to have a molecular weight of 500 and an iodine number of 320. It was confirmed by infrared spectrum that the product consisted mainly of 1,2- and 3,4-polymers of isoprene.

One hundred grams of the product was fractionated by high vacuum distillation column and the molecular weight and NMR spectrum of each fraction was determined. It was found from a ratio of the number of the protons of double bonds in the terminal norbornene ring to the total number of protons that the reaction product was a mixture of an oligomer having a norbornene ring at one end thereof and an oligomer having norbornene rings at both ends thereof and that the low polymer of isoprene having a norbornene ring at one end thereof comprised 60 percent on an average.

EXAMPLE 4

Four grams of small potassium pieces were added to 50 ml. of tetrahydrofuran contained in the same apparatus as in Example 1. Butadiene was blown into the mixture at a rate of 0.02 mol per minute for 30 minutes with stirring.

Simultaneously a solution of 14.3 grams of 5-chloromethyl-2-norbornene and 0.4 ml. of methanol in 10 ml. of tetrahydrofuran was dropped over 30 minutes. After-treatment was carried out in the same manner as in Example 1. Thus, 6 grams of a viscous liquid was obtained. It was confirmed by infrared spectrum showing the absorption of a norbornene ring and that of a butadiene polymer that the product was a low polymer having a norbornene ring.

EXAMPLE 5

A mixture solution of 28.6 grams of 5-chloromethyl-2-norbornene and 27.2 grams of isoprene was dropped through a dropping funnel into a mixture of 100 ml. of dehydrated tetrahydrofuran and 4.6 grams of metallic sodium fine powder contained in the same apparatus as in Example 1. The dropping was completed in 10 minutes while the reaction temperature was maintained at 30° to 40° C. After-treatment was carried out in the same manner as in Example 1. Thus, 23 grams of a viscous liquid was obtained. The product was found to have a molecular weight of 985 and the infrared spectrum showed that the product was a mixture of 3,4- and 1,2-polymers of isoprene. Also, it was confirmed by NMR that a norbornene ring bonds to the end of the product molecule.

EXAMPLE 6

A 200 ml. four necked flask was flushed with nitrogen. Four grams of metallic potassium fine powder was dispersed in 50 ml. of tetrahydrofuran contained in the flask. 14.3 g. of 5-chloromethyl-2-norbornene was dropped and the mixture was reacted with stirring. After two minutes, butadiene was blown at a rate of 0.02 mole per minute for 30 minutes. The reaction temperature was controlled at about 20° C. A small amount of methanol was added to terminate the polymerization. To the reaction mixture 200 ml. of petroleum ether was added and the whole was thoroughly mixed. After transferring to a separating funnel, 200 ml. of water was added and the whole was intimately mixed. The petroleum ether layer was separated and dried on silica gel for 24 hours. Unreacted materials were distilled off under reduced pressure. Thus, 5 grams of a liquid polymer was obtained.

It was confirmed by infrared spectrum showing the absorption of a norbornene ring and the absorption of a low polymer of butadiene that the product was a low polymer having a norbornene ring.

EXAMPLE 7

Fine powder of 2.3 g. of sodium was dispersed in 30 ml. of tetrahydrofuran contained in the same reactor as in Example 1. Then 14.3 g. of 5-chloromethyl-2-norbornene was dropped into the dispersion.

The isoprene liquid, 13.6 g., was then dropped and the reaction temperature was controlled to be 20° to 30° C. The reaction product was treated in the same manner as in Example 1 to obtain 11.5 grams of a viscous liquid.

It was found by a vapor pressure osmometer that the product had a molecular weight of 915. It was also confirmed by infrared spectrum, NMR and pyrolytic gas chromatography that a norbornene ring bonds at the end.

EXAMPLE 8

Fine powder of 2.3 g. of sodium was dispersed in 50 ml. of tetrahydrofuran contained in a 200 ml. glass autoclave, and 16 grams of 5-bromomethyl-2-norbornene was added. After 10 minutes, 10 grams of butadiene was added and the mixture was reacted for one day with stirring. After-treatment was carried out in the same manner as in Example 1. Fractional distillation gave 3.2 grams of a liquid having a molecular weight of 234 and a boiling point of 105° to 120° C. at 2.5 mm. Hg and 2.1 grams of a viscous liquid having a molecular weight of 585 as a residue.

It was confirmed by infrared spectrum, NMR and pyrolytic gas chromatography that both of these products have a norbornene ring at their end.

EXAMPLE 9

In a 200 ml. four neck flask 4 grams of metallic sodium, 17 ml. of 5-bromomethyl-2-norbornene, 50 ml. of tetrahydrofuran and 0.1 ml. of methanol were mixed under nitrogen stream. After allowing to stand at room temperature for 3 minutes, 20 grams of isoprene was dropped. The reaction product was treated in the same manner as in Example 1. Fractional distillation gave 3.3 grams of a fraction having a boiling point of 112° to 140° C. at 3 mm. Hg and a molecular weight of 251 and 5.3 grams of a still residue having a molecular weight of 542. The molecular weight of the former conincided with the theoretical value, 244, for 2-norbornene bonded with an isoprene dimer. The hydrogenation with a platinum oxide catalyst in ethanol gave an experimental value of 1.04 for the theoretical value of double bonds. Infrared spectrum showed that the double bonds were of vinyl type and the product had a structure:

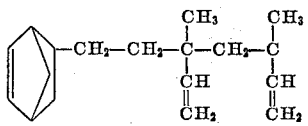

What is claimed is:

1. A 5-alkapolyenyl-2-norbornene represented by the formula

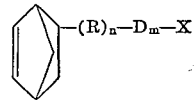

wherein

X is hydrogen or

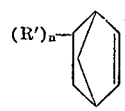

each R and R' is independently a hydrocarbon group of 1 to 20 carbon atoms;

$n$ is either 0 or 1;

$D_m$ is an alkapolyenyl group having 3 to 200 double bonds and a molecular weight of 100 to 20,000 derived from the linear polymerization of aliphatic conjugated dienes having 4 to 20 carbon atoms.

2. The nornornene of claim 1 wherein X is hydrogen.
3. The norbornene of claim 2 wherein $n$ is 0.
4. The norbornene of claim 2 wherein $n$ is 1.
5. The norbornene of claim 4 wherein R is a polymeric unit which results from the polymerization of a monomer selected from the group consisting of 1,3-butadiene, isoprene, 2-ethyl-1,3-butadiene, 2,3-dimethyl-1,3-butadiene, piperylene, 1,3-hexadiene and 2,4-hexadiene.
6. The norbornene of claim 1 wherein said aliphatic conjugated diene is butadiene.
7. The norbornene of claim 1 wherein said aliphatic conjugated diene is isoprene.
8. A process for the production of 5-alkapolyenyl-2-norbornene which comprises contacting a 5-halo-2-norbornene or a 5-(halohydrocarbyl)-2-norbornene having from 1 to 20 carbon atoms in the hydrocarbyl group with a polymer of an aliphatic diene having 4 to 20 carbon atoms and an alkali metal at a terminal position in the presence of an ether selected from the group consisting of acyclic ethers of the formulae $R_1OR_2$ or $R_1OROR_2$ and cyclic ethers of the formulae

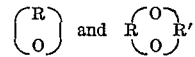

wherein $R_1$ and $R_2$ represent hydrocarbon groups having 1 to 20 carbon atoms and R and R' represent bivalent hydrocarbon groups having 1 to 20 carbon atoms.

9. The process of claim 8 wherein the reaction is carried out in an alcohol containing 1 to 20 carbon atoms, the molar amount of said alcohol being less than the molar amount of said alkali compound.

10. The process of claim 8 wherein the alkali compound and the norbornene compound are mixed in contact with said aliphatic conjugated diene.

References Cited

UNITED STATES PATENTS

| | | | |
|---|---|---|---|
| 3,345,419 | 10/1967 | Tinsley | 260—666 Py |
| 3,162,620 | 12/1964 | Gladding | 260—88.2 D |
| 3,527,739 | 9/1970 | Valvassori et al. | 260—666 Py |

DELBERT E. GANTZ, Primary Examiner

V. O'KEEFE, Assistant Examiner